(12) United States Patent
Hall

(10) Patent No.: US 11,627,734 B2
(45) Date of Patent: Apr. 18, 2023

(54) ADJUSTABLE FISHING ROD HOLDER FOR A BOAT

(71) Applicant: Richard Clark Hall, East New Market, MD (US)

(72) Inventor: Richard Clark Hall, East New Market, MD (US)

( * ) Notice: Subject to any disclaimer, the term of this patent is extended or adjusted under 35 U.S.C. 154(b) by 0 days.

(21) Appl. No.: 17/222,598

(22) Filed: Apr. 5, 2021

(65) Prior Publication Data

US 2022/0312753 A1 Oct. 6, 2022

(51) Int. Cl.
*A01K 97/10* (2006.01)

(52) U.S. Cl.
CPC .................... *A01K 97/10* (2013.01)

(58) Field of Classification Search
CPC ...... A01K 97/08; A01K 97/10; B63B 25/002; B63B 35/14
USPC .................... 43/21.2; 114/255, 343
See application file for complete search history.

(56) References Cited

U.S. PATENT DOCUMENTS

| | | | | |
|---|---|---|---|---|
| 4,384,542 A * | 5/1983 | Wilson | ............... | A01K 91/08 114/364 |
| 4,964,233 A * | 10/1990 | Benson | ............... | A01K 97/10 43/17 |
| 5,044,298 A * | 9/1991 | Pepper | ............... | B63B 17/02 114/361 |
| 5,191,852 A * | 3/1993 | Rupp | ............... | A01K 91/08 43/27.4 |
| 5,247,759 A * | 9/1993 | Noriega | ............... | A01K 97/10 43/21.2 |
| 5,540,010 A * | 7/1996 | Aragona | ............... | A01K 91/065 43/26.1 |
| 5,588,630 A * | 12/1996 | Chen-Chao | ............... | F16C 11/10 248/514 |
| 5,715,952 A * | 2/1998 | Chichetti | ............... | A01K 97/10 248/512 |
| 5,815,976 A * | 10/1998 | Jernigan | ............... | A01K 97/10 248/538 |
| 6,381,897 B1 * | 5/2002 | Walsh | ............... | A01K 97/10 43/21.2 |
| 6,408,779 B1 * | 6/2002 | Roy | ............... | A01K 91/08 43/43.12 |
| 6,725,799 B2 * | 4/2004 | Tull | ............... | B63B 17/02 114/361 |
| 7,007,906 B2 * | 3/2006 | Slatter | ............... | A01K 91/08 43/21.2 |
| 7,159,354 B1 * | 1/2007 | White | ............... | A01K 97/12 248/512 |
| 7,232,099 B1 * | 6/2007 | Wilcox | ............... | B63B 25/002 248/231.91 |
| 7,395,772 B2 * | 7/2008 | Slatter | ............... | A01K 97/10 403/359.5 |

(Continued)

*Primary Examiner* — Yvonne R Abbott-Lewis
(74) *Attorney, Agent, or Firm* — Walter Ottesen, P.A.

(57) ABSTRACT

An adjustable rod holder for a boat includes: a main shaft; a rod holder beam; a support arm for holding the rod holder beam in a spaced relationship to the main shaft; the support arm having a first end; the support arm being connected to the main shaft at the first end; a rod receptacle mounted on the rod holder beam and being configured to receive a handle of a fishing rod; the main shaft being configured to attach to a boat; and, the main shaft being configured to be rotatable so as to move the rod holder beam between a first position and a second position.

20 Claims, 4 Drawing Sheets

(56) References Cited

U.S. PATENT DOCUMENTS

| | | | | |
|---|---|---|---|---|
| 7,497,184 B1* | 3/2009 | Chaffin | | B63B 15/00 114/361 |
| 7,530,324 B2* | 5/2009 | Salerno | | A01K 97/10 114/364 |
| 7,841,124 B2* | 11/2010 | Wegman | | A01K 97/10 43/21.2 |
| 8,375,622 B1* | 2/2013 | Holzmann, Jr. | | A01K 97/10 43/21.2 |
| 8,393,111 B1* | 3/2013 | Johnson | | A01K 97/10 43/21.2 |
| 9,010,490 B1* | 4/2015 | Mosier | | E06C 7/48 248/206.5 |
| 9,565,934 B2* | 2/2017 | Hall, II | | A47B 81/005 |
| 9,986,827 B1* | 6/2018 | Long | | B60B 33/0021 |
| 10,375,945 B2* | 8/2019 | Potts | | A01K 97/10 |
| D937,752 S * | 12/2021 | Woller | | D12/414.1 |
| 2003/0111101 A1* | 6/2003 | Tull | | B63B 17/02 135/88.01 |
| 2005/0102881 A1* | 5/2005 | Legendziewicz | | A01K 97/10 43/21.2 |
| 2005/0229470 A1* | 10/2005 | King | | A01K 97/10 43/21.2 |
| 2011/0278524 A1 | 11/2011 | Paredes | | |
| 2013/0333271 A1* | 12/2013 | Rupp | | A01K 91/08 43/27.4 |
| 2014/0033600 A1* | 2/2014 | McCorkle | | A01K 97/10 43/21.2 |
| 2014/0110363 A1* | 4/2014 | Brown | | E05B 65/00 70/58 |
| 2014/0215891 A1* | 8/2014 | Conry | | A01K 97/10 43/4.5 |
| 2014/0346206 A1* | 11/2014 | McKnight | | A47B 81/005 224/404 |
| 2016/0045024 A1* | 2/2016 | Roberts | | A47B 81/005 248/512 |
| 2017/0196212 A1* | 7/2017 | Tuck | | A01K 97/10 |
| 2019/0320636 A1 | 10/2019 | Potts | | |
| 2020/0029544 A1* | 1/2020 | Draper | | A01K 97/10 |
| 2021/0161117 A1* | 6/2021 | Rouse | | A01K 97/10 |

* cited by examiner

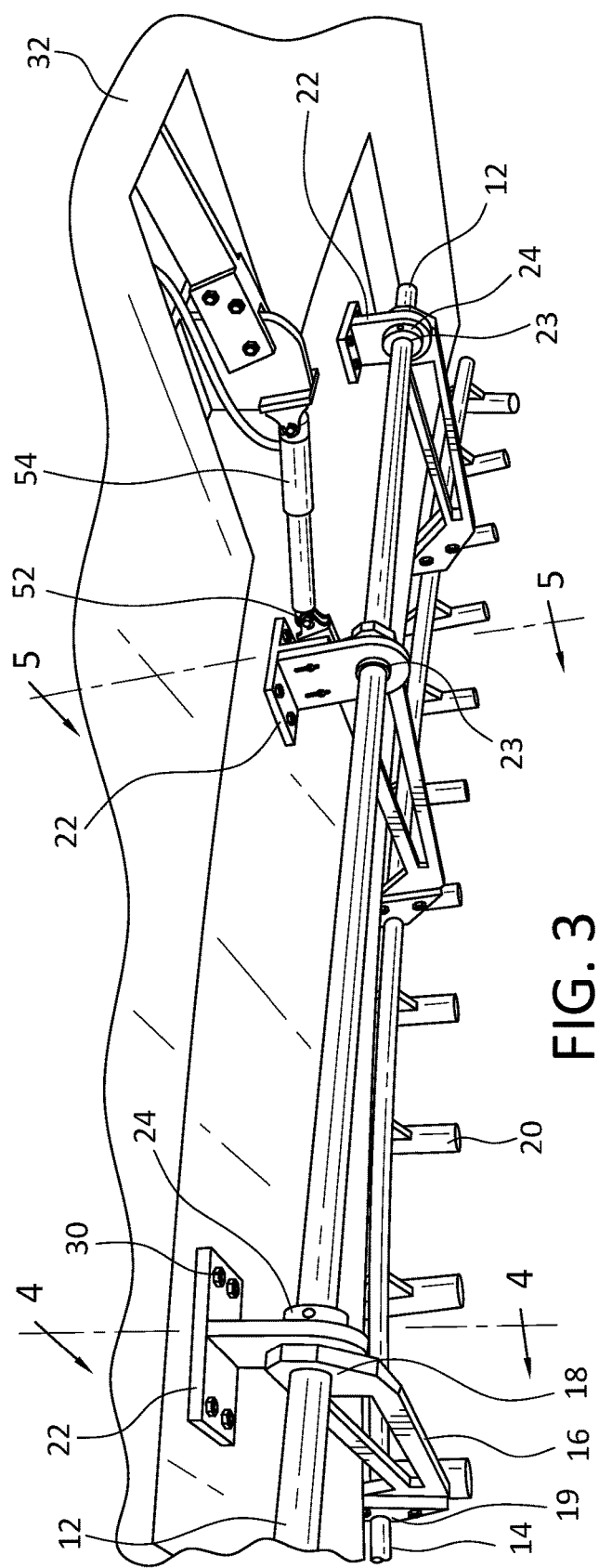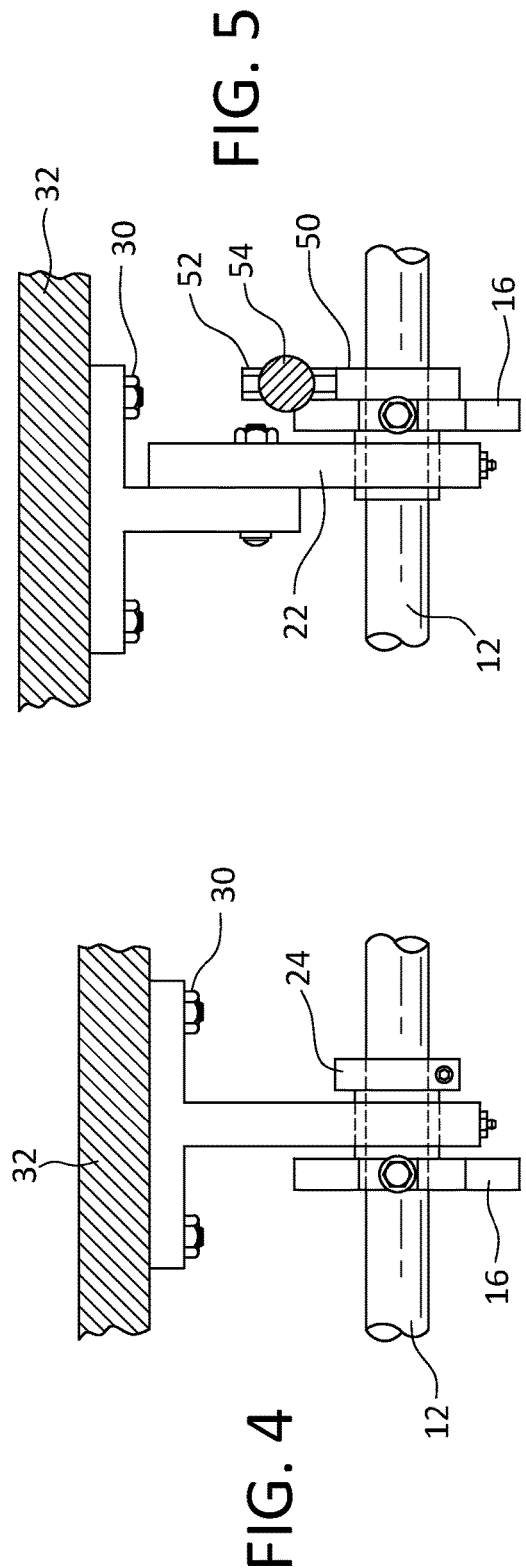

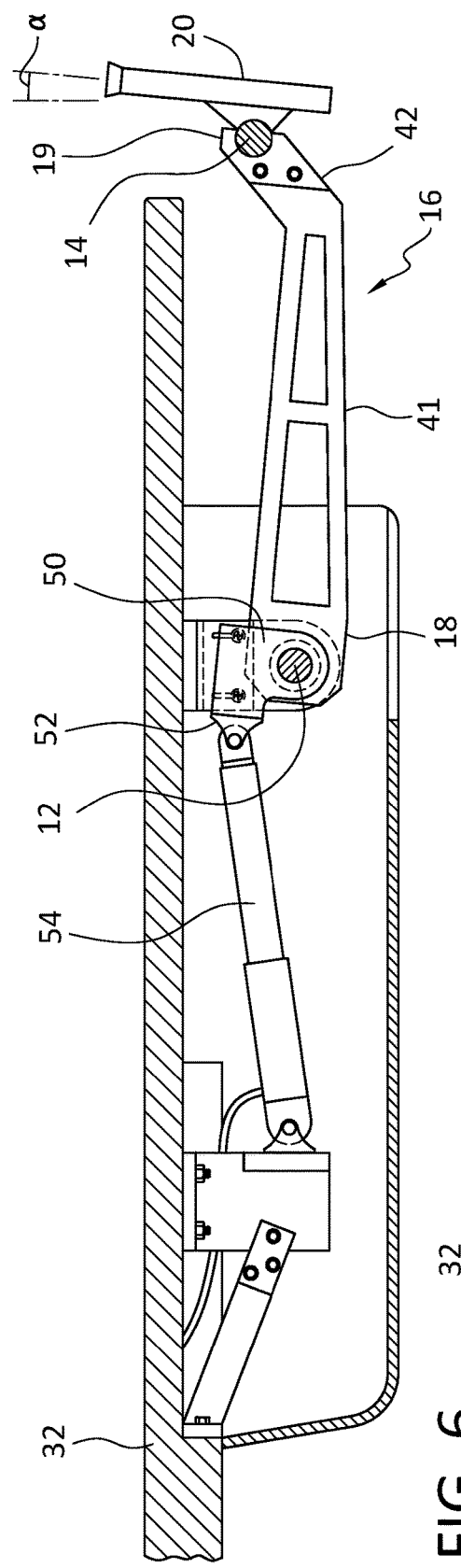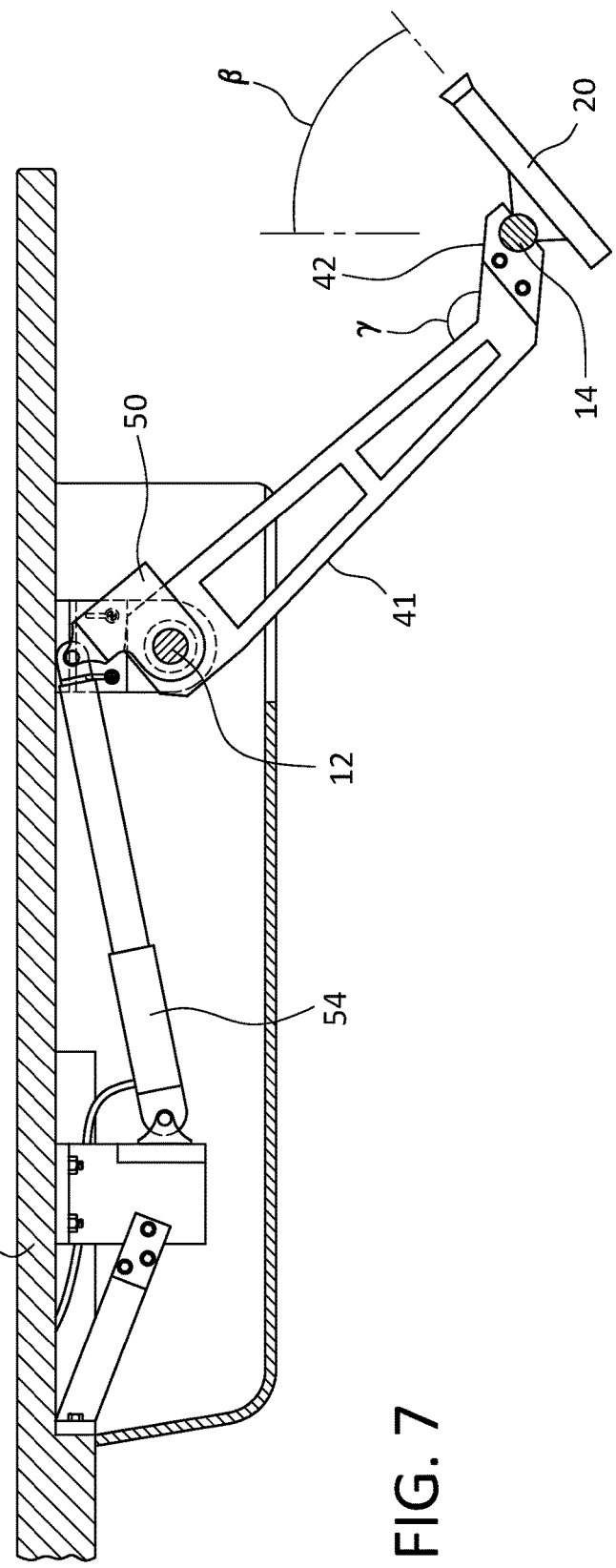

ADJUSTABLE FISHING ROD HOLDER FOR A BOAT

TECHNICAL FIELD

The disclosure relates to a fishing rod holder for a boat.

BACKGROUND

Fishing rod holders are used to hold a fishing rod. Fishing rod holders can be a receptacle for receiving a handle of a fishing rod. A person fishing may place a fishing rod in a fishing rod holder, for example, while fishing and trolling so that the person need not hold the rod the entire time. In order to facilitate trolling while the fishing rod is being held by the holder, the rod holders are often installed at an elevated location of a boat, for example on the roof or a T-Top of a fishing boat. Arranging the rod holders at an elevated location has advantages, for example, enabling people to walk below the fishing lines which are actively trolling and avoiding the lines getting snagged at the back of the boat or at the motor. However, at the elevated location, the fishing rods are more difficult to access and retrieve. Safety can be an issue when people stretch/reach upward or climb onto an object to reach the fishing rods. This can be especially problematic when conditions on the water are rough, there are high winds, and/or the boat is moving at speed causing a person to fall and injure themselves or fall overboard.

SUMMARY

It is an object of the invention to provide a rod holder which can be accessed in a safer and easier manner.

The aforementioned object can, for example, be achieved via an adjustable rod holder for a boat. The adjustable rod holder includes: a main shaft; a rod holder beam; a support arm for holding the rod holder beam in a spaced relationship to the main shaft; the support arm having a first end; the support arm being connected to the main shaft at the first end; a rod receptacle mounted on the rod holder beam and being configured to receive a handle of a fishing rod; the main shaft being configured to attach to a boat; and, the main shaft being configured to be rotatable so as to move the rod holder beam between a first position and a second position.

The aforementioned object can, for example, also be achieved via an adjustable rod holder for a boat. The adjustable rod holder includes: a main shaft; a rod holder beam; a support arm for holding the rod holder beam in a spaced relationship to the main shaft; the support arm having a first end; the support arm being connected to the main shaft at the first end; a rod receptacle mounted on the rod holder beam and being configured to receive a handle of a fishing rod; the main shaft being configured to attach to a boat; and, the main shaft being configured to be rotatable so as to move the rod holder beam between a first position and a second position; wherein the rod receptacle is oriented vertically in the first position and at an angle of between 30 degrees and 60 degrees relative to a horizontal in the second position.

BRIEF DESCRIPTION OF THE DRAWINGS

The invention will now be described with reference to the drawings wherein:

FIG. 3 shows a rear perspective view of the adjustable rod holder of FIG. 1;

FIG. 4 shows a first connection of the adjustable rod holder to the roof of a boat in detail;

FIG. 5 shows a second connection of the adjustable rod holder to the roof of the boat with an actuating part;

FIG. 6 shows the adjustable rod holder in a side view with the rod holder of FIG. 1 in the first, raised position; and, FIG. 7 shows the adjustable rod holder in a side view with the rod holder of FIG. 2 in the second, lowered position.

DESCRIPTION OF THE PREFERRED EMBODIMENTS

Figure 1:
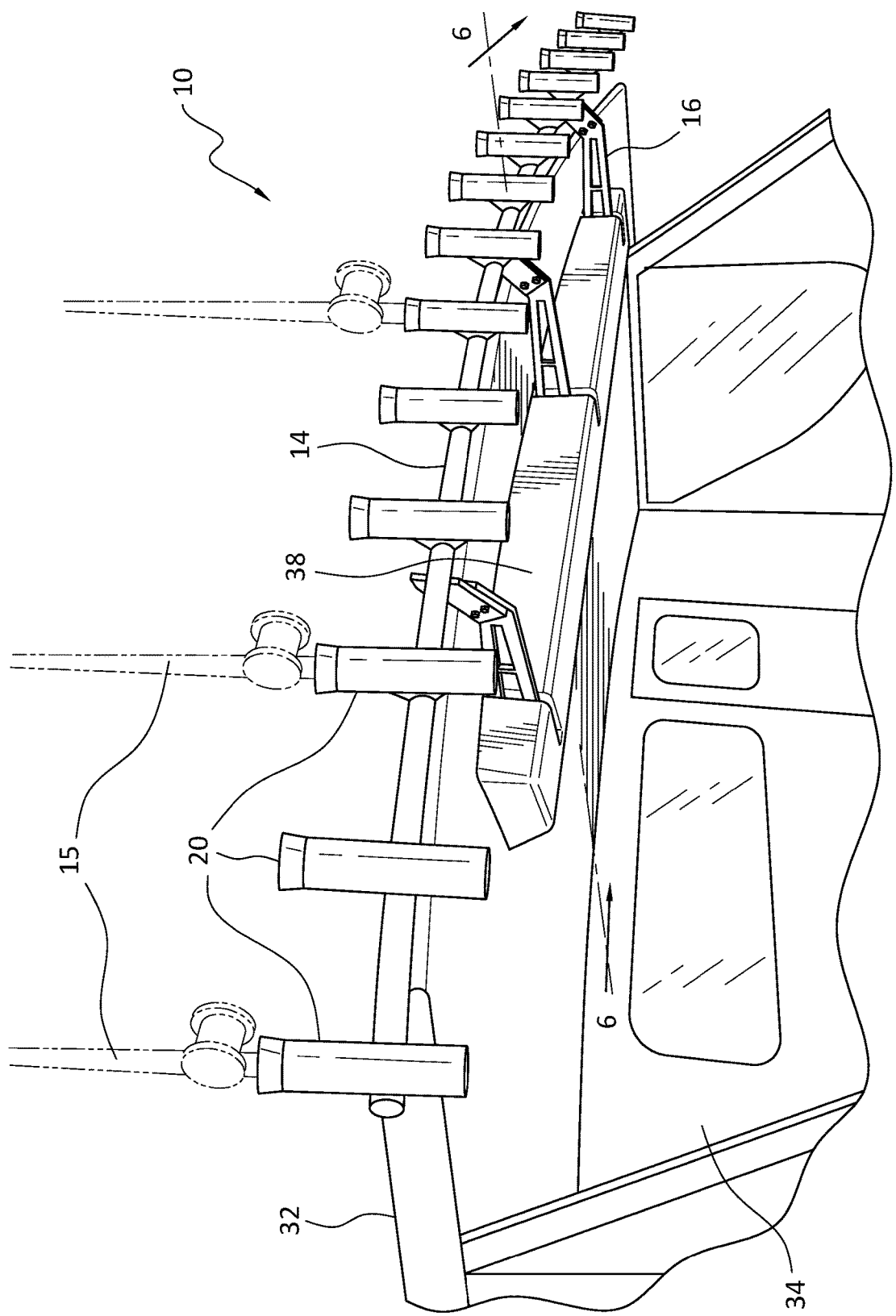
FIG. 1 shows an embodiment of an adjustable rod holder in a first, raised position.

FIG. 1 shows an adjustable rod holder 10 according to the disclosure. A plurality of rod receptacles 20 are attached to a rod holder beam 14. The rod receptacles 20 can be welded to the rod holder beam 14 or attached thereto in any other suitable manner. A fishing rod 15 can be inserted into the rod receptacle 20, in particular the handle of a fishing rod 15. The adjustable fishing rod holder 10 is shown in a first position in FIG. 1 wherein the rod holder 10 is in a raised position. The rod holder 10 can be configured to accommodate a plurality of fishing rods 15 via a plurality of rod receptacles 20. A fishing rod 15 can be placed in the rod holder 10, for example, for storage or for holding the fishing rod 15 while trolling for fish. When in the first, raised position, the fishing rod holder 10 enables people to walk below the rod holder, that is, at least in the raised position, the adjustable rod holder 10 does not present an obstacle to passengers moving about on the boat 34. In the first, raised position, the rod receptacles are approximately vertical. According to an embodiment, the rod receptacles 20 are at an angle $\alpha$ of 5 degrees from vertical leaning aft.

The adjustable rod holder 10 can be attached to the roof 32 of the boat 34 via brackets 22. The adjustable rod holder 10 can also be integrally formed with the roof 32. The support arms 16 are fixedly connected to a main shaft 12 so as to move therewith, for example, via a bolt connection. In the embodiment shown in FIG. 1, the main shaft 12 of the adjustable rod holder 10 is disposed in a housing 38. The housing 38 is provided with openings/slits 39 which enable the support arms to move in a downward direction from the first, raised position to the second, lowered position and back. In an embodiment, the main shaft 12 is 1.5 inches in diameter. The housing 38 can be a fiberglass cover and can serve to shield the moving components from the outside marine environment.

Figure 2:
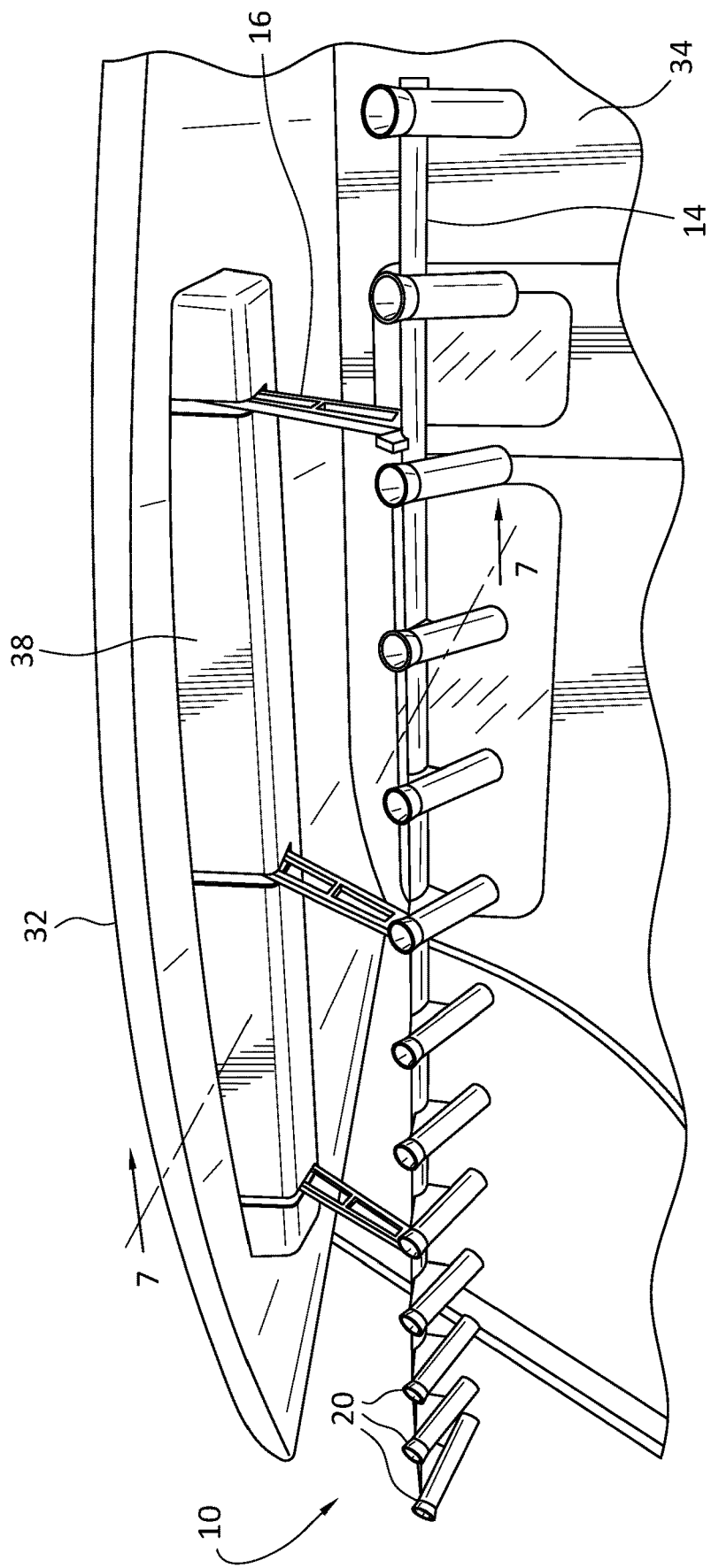
FIG. 2 shows the adjustable rod holder of FIG. 1 in a second, lowered position.

FIG. 2 shows the adjustable rod holder 10 of FIG. 1 in a second, lowered position. Starting from the first position shown in FIG. 1, the main shaft 12 in the housing 38 is rotated causing the rod holder beam 14 and the rod holder receptacles 20 to pivot downward about the main shaft 12. In the second, lowered position, the rod receptacles 20 are lowered enabling a person to insert a handle of a fishing rod 15 into a rod receptacle 20 or conversely remove a fishing rod 15 from a rod receptacle 20. When in the lowered position, the rod receptacles are at an angle $\beta$ of approximately 30 to 60 degrees from vertical leaning aft.

According to an embodiment, the rod receptacles are at 50 degrees to vertical leaning aft in the lowered position. When a fish is attached to the fishing line of a fishing rod inserted into a rod receptacle 20, at least one of a forward motion of the boat and a drag on the line, for example caused by a movement of a fish attached to the line, can exert a pulling force on the fishing line which in turn can pull the fishing rod 15 toward the aft of the boat. In such a situation the fishing rod may go overboard or strike a passenger causing injury. The positioning of the rod receptacles 20 at 30 to 60 degrees from vertical leaning aft in the lowered position aids the retention of the fishing rod 15 in the rod receptacle 20. That is, when a person has noticed a pull on the line of a fishing rod 15 inserted into the adjustable fishing rod holder 10, the person can move the rod receptacles downward so as to facilitate a removal of the fishing rod 15 from the rod receptacle 20 for operating the fishing rod 15. If the rod receptacles 20 were to move to a horizontal position, the fishing rod 15 could easily be accidentally pulled out of the rod receptacle 20 due to a pull on the line and the fishing rod 15 could be pulled overboard. The angular position of the rod receptacles 20 in the lowered position aids the retention of the fishing rod 15 exactly at the moment the rod 15 is likely to be pulled out unintentionally of the rod receptacle 20 so that a person can safely remove the fishing rod 15 from the rod holder 10 with control. Further, the support arms 16 as a function of their length cause the rod receptacles 20 to be at a lower position when the rod holder is in the second position.

FIG. 3 shows an adjustable rod holder 10 in the first, raised position without a housing 38. The adjustable rod holder 10 is attached to the roof 32 of the boat 34 via a support bracket 22. The bracket 22 defines a bracket opening 23. The main shaft 12 of the adjustable rod holder 10 projects through the bracket opening 23 in the bracket 22 and is held therein. The connection between the main shaft 12 and the bracket 22 can include a bushing 24. The bushing 24, through which the main shaft 12 is inserted, can provide a bearing surface to facilitate a relative rotation of the main shaft 12 relative to the bracket 22. The bushings 24 can, for example, be greaseable nylon bushings. In the embodiment shown in FIG. 3, three support brackets 22 are fixed to the underside of the roof 32 via fasteners 30.

A support arm 16 is attached to the main shaft 12. In the embodiment shown in FIG. 3, the support arm 16 has an opening 36 at its first end 18. The support arm 16 is fixedly connected to the main shaft 12 at the first end 18 and moves therewith when the main shaft 12 rotates. The support arm 16 has a second end 19 at which the support arm 16 supports a rod holder beam 14. A plurality of support arms 16 can be used to connect the rod holder beam 14 to the main shaft 12. In the embodiment shown in FIG. 1, three support arms 16 arranged at a spaced relationship to each other connect the rod holder beam 14 to the main shaft 12. The rod holder beam 14 can have a plurality of rod receptacles 20 attached thereto.

The support arm 16 can include two segments, a first segment 41 and a second segment 42. The first segment 41 and the second segment 42 can be offset by an obtuse angle γ. The first segment 41 extends from the first end 18 up to a transition to the second segment 42 which projects upwards at an obtuse angle γ with respect to the first segment 41. The second segment 42 includes the second end 19 at which the support arm 16 is connected to the rod holder beam 14. According to an embodiment, the second segment 42 is shorter than the first segment 41. The first segment 41 and the second segment 42 can be formed integrally or can each be separate parts interconnected, for example, via fasteners.

An actuator 54 is attached to the main shaft 12 by a shaft bracket 50. In the embodiment shown in FIG. 3, the actuator 54 is a cylinder. The actuator can, for example, also be embodied as an electric motor or other device for rotating the main shaft 12. The actuator 54 may be controlled remotely. In the case of a cylinder as the actuator 54, when the cylinder 54 is energized, starting from the first, raised position, it rotates the shaft, causing the support arms 16 to move on a downward arc. When the cylinder is reversed, the opposite action takes place, that is the main shaft 12 rotates in the opposite direction causing the support arms 16 to move in an upward arc and the rod holder 10 goes back up toward the first, raised position. The actuator 54 acts on the main shaft 12 via the shaft bracket 50. According to an embodiment, the rod holder 10 may also be stopped and can assume any position between the first, raised position and the second, lowered position.

The support arms 16, main shaft 12, rod holder beam 14, brackets 22 et cetera can all be made of rust-free aluminum and/or stainless steel.

FIG. 4 shows the connection of the bracket 22 to the roof of the boat, the connection of the main shaft 12 to the bracket 22 via the bushing 24 and the connection between the main shaft 12 and the support arm 16. The bracket 22 is attached to the roof 32 of the boat via fasteners 30. The main shaft 12 is inserted through the bracket opening 23. A bushing 24 surrounding the main shaft 12 is disposed between the bracket 22 and the main shaft and provides a bearing surface aiding a relative rotation of the main shaft 12 with respect to the bracket 22. The main shaft 12 also projects through an opening in the support arm 16. The support arm 16 is fixedly connected to the main shaft 12 so as to rotate therewith.

FIG. 5 shows similar connections as FIG. 4 with the addition of a shaft bracket 50. The shaft bracket 50 is fixedly connected to the main shaft 12. In the embodiment shown in FIG. 5, the actuator 54 is a cylinder which acts on the shaft bracket 50. When the cylinder is activated, the cylinder extends and acts on the actuating element 52 of the shaft bracket 50. The cylinder acting on the actuating element 52 by extending causes the main shaft 12 to rotate in a first direction and when the cylinder retracts, the main shaft 12 rotates in a second direction, opposite to the first direction. FIG. 6 shows the cylinder in a retracted position. As a consequence of the cylinder being in the retracted position, the rod holder 10 is in the first, raised position. FIG. 7 shows the cylinder in the extended position, wherein the rod holder 10 is in the second, lowered position.

It is understood that the foregoing description is that of the preferred embodiments of the invention and that various changes and modifications may be made thereto without departing from the spirit and scope of the invention as defined in the appended claims.

LIST OF REFERENCE NUMERALS

10 Adjustable rod holder
12 Main shaft
14 Rod holder beam
15 Fishing rod
16 Support arm
18 First end of support arm
19 Second end of support arm
20 Rod receptacle
22 Bracket
23 Bracket opening
24 Bushing
30 Fastener
32 Roof
34 Boat
36 Opening
38 Housing
39 Openings/slits
41 First segment of support arm 42 Second segment of support arm
50 Shaft bracket
52 Actuating element
54 Actuator

What is claimed is:

1. An adjustable rod holder for a boat, the adjustable rod holder comprising:
    a rotatable main shaft;
    a rod holder beam;
    a support arm for holding said rod holder beam in a spaced relationship to said main shaft;
    said support arm having a first end;
    said support arm being fixedly connected to said main shaft at said first end so as to move therewith;
    a rod receptacle mounted on said rod holder beam and being configured to receive a handle of a fishing rod;
    said main shaft being configured to attach to the boat; and,
    said rotatable main shaft being configured to be rotatable so as to move said rod holder beam between a raised position and a loading/removal position.

2. The adjustable rod holder of claim 1, wherein said first position is higher than said second position.

3. The adjustable rod holder of claim 1 further comprising at least two support brackets configured to attach said main shaft to the boat.

4. The adjustable rod holder of claim 3, wherein said at least two support brackets each include a bushing and said main shaft is engaged in said bushings.

5. The adjustable rod holder of claim 1, wherein said support arm is a first support arm; and, the adjustable rod holder further comprises a second support arm having a first end, said second support arm being connected to said main shaft at said first end of said second support arm.

6. The adjustable rod holder of claim 5, wherein said first support arm and said second support arm are fixedly connected to said main shaft so as to rotate therewith.

7. The adjustable rod holder of claim 1, wherein the adjustable rod holder has a plurality of rod receptacles.

8. The adjustable rod holder of claim 1, wherein said raised position is a trolling position.

9. The adjustable rod holder of claim 4, wherein said at least two support brackets are configured to attach to a roof of the boat or a T-Top of the boat.

10. The adjustable rod holder of claim 5 further comprising a third support arm having a first end; and, said third support arm being connected to said main shaft at said first end of said third support arm.

11. The adjustable rod holder of claim 1, wherein said rod holder beam is configured to assume any desired position between said first position and said second position.

12. The adjustable rod holder of claim 1 further comprising an actuator configured to rotate said main shaft.

13. The adjustable rod holder of claim 1 further comprising a mechanical linkage configured to enable a user to rotate said main shaft via said mechanical linkage.

14. The adjustable rod holder of claim 1 further comprising a cylinder configured to rotate said main shaft.

15. The adjustable rod holder of claim 1, wherein said support arm includes a first arm segment and a second arm segment, wherein said second arm segment extends at an angle to said first segment.

16. The adjustable rod holder of claim 15, wherein said angle is an obtuse angle.

17. The adjustable rod holder of claim 16, wherein said angle is 135 degrees.

18. The adjustable rod holder of claim 1, wherein:
    said support arm includes a first arm segment and a second arm segment;
    said first arm segment includes said first end;
    said second arm segment extends at an obtuse angle from said first arm segment; and,
    said first arm segment is longer than said second arm segment.

19. An adjustable rod holder for a boat, the adjustable rod holder comprising:
    a rotatable main shaft;
    a rod holder beam;
    a support arm for holding said rod holder beam in a spaced relationship to said main shaft;
    said support arm having a first end;
    said support arm being fixedly connected to said main shaft at said first end so as to move therewith;
    a rod receptacle mounted on said rod holder beam and being configured to receive a handle of a fishing rod;
    said rotatable main shaft being configured to attach to the boat; and,
    said rotatable main shaft being configured to be rotatable so as to move said rod holder beam between a first position and a second position;
    wherein said rod receptacle is oriented vertically in said first position and at an angle of between 30 degrees and 60 degrees relative to a horizontal in said second position.

20. The adjustable rod holder of claim 1, wherein said rod receptacles are at an angle of 5 degrees to a vertical in said first position and at 50 degrees to the vertical in said second position.

* * * * *